(12) United States Patent
Bang et al.

(10) Patent No.: US 12,167,191 B2
(45) Date of Patent: Dec. 10, 2024

(54) WEARABLE ELECTRONIC DEVICE AND OPERATION METHOD THEREOF

(71) Applicant: SAMSUNG ELECTRONICS CO., LTD., Suwon-si (KR)

(72) Inventors: Kyoungho Bang, Suwon-si (KR); Hangil Moon, Suwon-si (KR); Jaeseong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 218 days.

(21) Appl. No.: 17/861,444

(22) Filed: Jul. 11, 2022

(65) Prior Publication Data

US 2023/0033379 A1    Feb. 2, 2023

Related U.S. Application Data

(63) Continuation of application No. PCT/KR2022/004932, filed on Apr. 6, 2022.

(30) Foreign Application Priority Data

Aug. 2, 2021    (KR) .................. 10-2021-0101149

(51) Int. Cl.
*H04R 29/00* (2006.01)
*G06F 3/16* (2006.01)
*H04R 1/10* (2006.01)

(52) U.S. Cl.
CPC ........... *H04R 1/1016* (2013.01); *G06F 3/167* (2013.01); *H04R 1/1083* (2013.01); *H04R 1/1091* (2013.01); *H04R 2460/15* (2013.01)

(58) Field of Classification Search
CPC .. H04R 1/1016; H04R 1/1083; H04R 1/1091; G06F 3/167
See application file for complete search history.

(56) References Cited

U.S. PATENT DOCUMENTS 10,599,389 B2    3/2020    Risberg et al.
10,834,494 B1    11/2020    Tong et al.
10,979,836 B2    4/2021    Usher et al.
(Continued)

FOREIGN PATENT DOCUMENTS

JP    2009-284097    12/2009
KR    10-2006-0039117    5/2006
(Continued)

OTHER PUBLICATIONS

Extended European Search Report dated Aug. 7, 2023 issued in European Patent Application No. 22754759.3.
(Continued)

*Primary Examiner* — Simon King
(74) *Attorney, Agent, or Firm* — NIXON & VANDERHYE P.C.

(57) ABSTRACT

A wearable electronic device including a speaker and a microphone is configured to: generate a detection signal to detect whether a sound leakage occurs, receive, through the microphone, a feedback signal in which a signal obtained by outputting the detection signal into an ear canal of a user through the speaker is collected, calculate a difference value between the feedback signal and the detection signal, and correct a playback sound output by the wearable electronic device based on the difference value.

20 Claims, 10 Drawing Sheets

(56) References Cited

U.S. PATENT DOCUMENTS

| | | | |
|---|---|---|---|
| 2008/0137873 A1* | 6/2008 | Goldstein | H04R 1/1083 381/57 |
| 2010/0074451 A1* | 3/2010 | Usher | H04R 29/00 381/58 |
| 2013/0170656 A1 | 7/2013 | Tiscareno et al. | |
| 2016/0277860 A1 | 9/2016 | Vesa et al. | |
| 2019/0129687 A1 | 5/2019 | Risberg et al. | |
| 2020/0275223 A1 | 8/2020 | Usher et al. | |
| 2021/0014596 A1 | 1/2021 | Sun et al. | |
| 2021/0014597 A1 | 1/2021 | Andersen et al. | |
| 2022/0223133 A1* | 7/2022 | Mccutcheon | G10K 11/17825 |

FOREIGN PATENT DOCUMENTS

| | | |
|---|---|---|
| KR | 10-2021-0001646 | 1/2021 |
| KR | 10-2021-0008329 | 1/2021 |

OTHER PUBLICATIONS

Search Report issued Jul. 13, 2022 in counterpart International Patent Application PCT/KR2022/004932.

* cited by examiner

WEARABLE ELECTRONIC DEVICE AND OPERATION METHOD THEREOF

CROSS-REFERENCE TO RELATED APPLICATIONS

This application is a continuation of International Application No. PCT/PCT/KR2022/004932 designating the United States, filed on Apr. 6, 2022, in the Korean Intellectual Property Receiving Office and claiming priority to Korean Patent Application No. 10-2021-0101149 filed on Aug. 2, 2021, in the Korean Intellectual Property Office, the disclosures of which are incorporated by reference herein in their entireties.

BACKGROUND

1. Field

The disclosure relates to a wearable electronic device and an operation method of the wearable electronic device.

2. Description of Related Art

A wearable electronic device may be worn on a body part of a user, for example, ears, neck, head, or wrist. Through the wearable electronic device, the user may conduct various tasks, for example, listening to music and talking over the phone with a counterpart. The wearable electronic device may be connected to a user terminal and/or an external electronic device by wire or wirelessly.

SUMMARY

According to an example embodiment, a method of operating a wearable electronic device including a speaker and a microphone includes: generating a detection signal for detecting whether a sound leakage of the wearable electronic device occurs, receiving, through the microphone, a feedback signal in which a signal obtained by outputting the detection signal into an ear canal of a user through the speaker is collected, calculating a difference value between the feedback signal and the detection signal, and correcting a playback sound output by the wearable electronic device based on the difference value.

According to an example embodiment, a wearable electronic device includes: a sound generator comprising circuitry configured to generate a detection signal for detecting whether a sound leakage occurs, a speaker configured to output the detection signal into an ear canal of a user, a microphone configured to receive a signal output through the speaker, and a processor configured to: calculate a difference value between a feedback signal received through the microphone and the detection signal, and correct a playback sound output by the wearable electronic device.

Other features and aspects will be apparent from the following detailed description, the drawings, and the claims.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
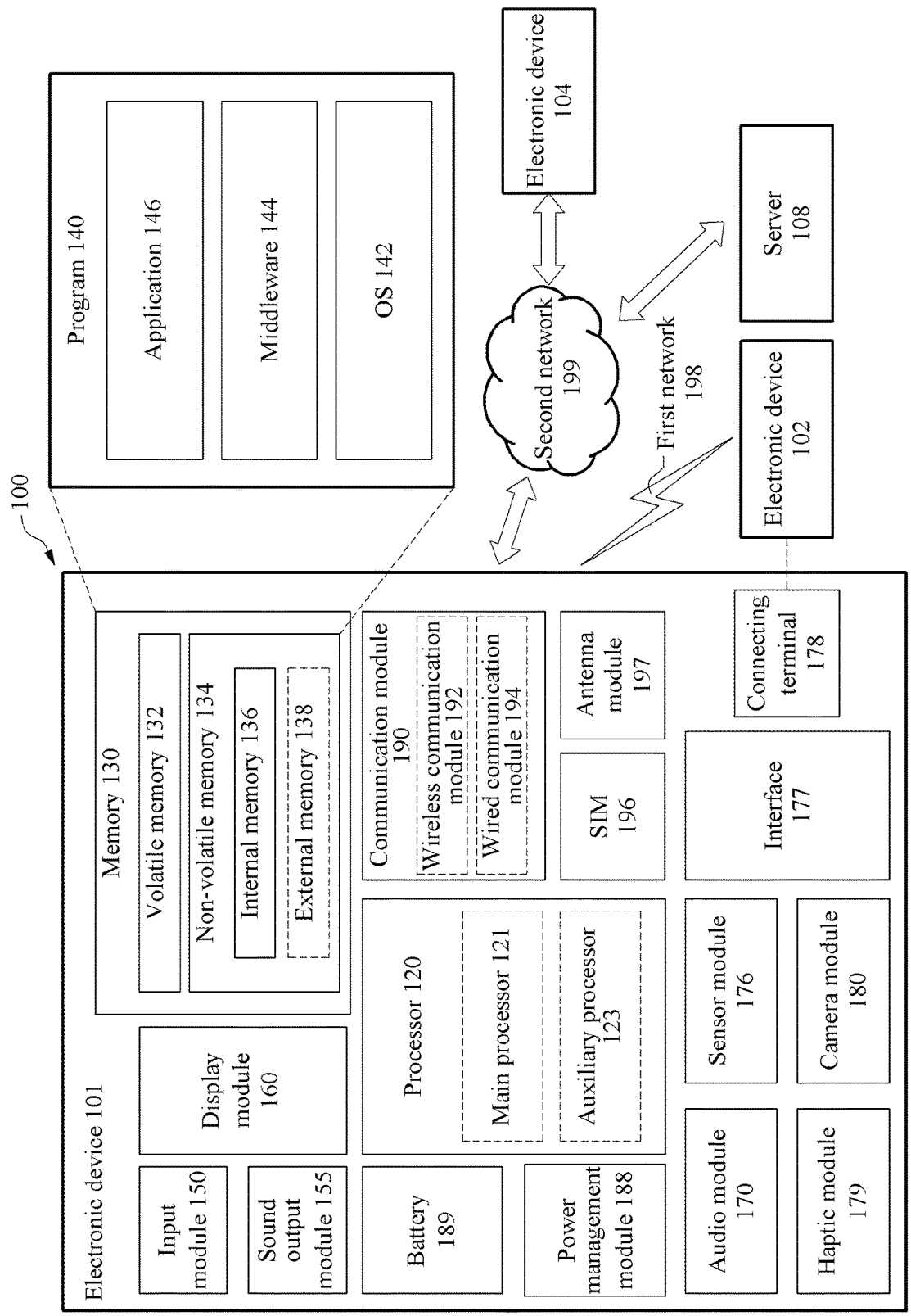
FIG. 1 is a block diagram illustrating an example electronic device in a network environment according to embodiments.

Hereinafter, various example embodiments will be described in greater detail with reference to the accompanying drawings. When describing the example embodiments with reference to the accompanying drawings, like reference numerals refer to like elements and a repeated description related thereto will be omitted.

FIG. 1 is a block diagram illustrating an example electronic device in a network environment according to embodiments. Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one (e.g., the connecting terminal 178) of the above components may be omitted from the electronic device 101, or one or more other components may be added in the electronic device 101. In various example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121. The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing records. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with an external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel The communication module 190 may include one or more communication processors that are operable independently of the processor 120 (e.g., an AP) and that support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general-purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. The external electronic device 102 may be, for example, a first wearable electronic device 220-1 and/or a second wearable electronic device 220-2 to be described hereinafter with reference to FIG. 2.

According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least a part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least a part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
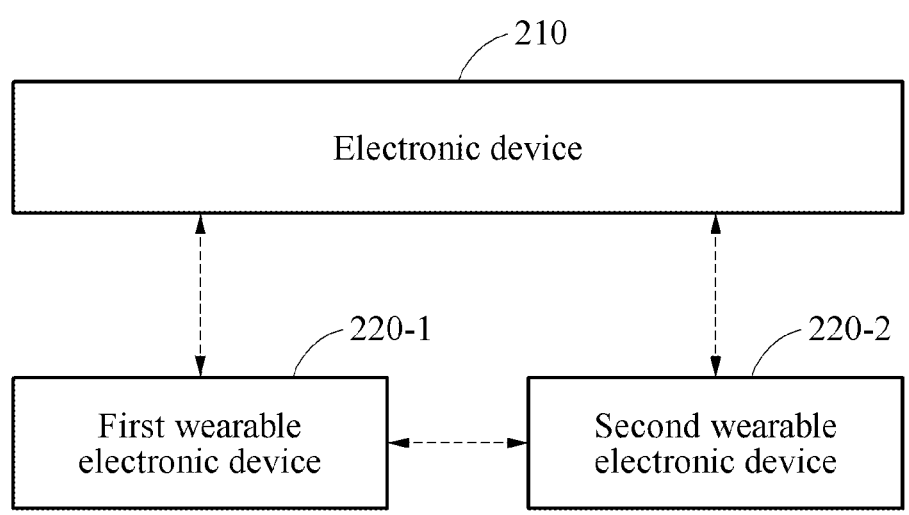
FIG. 2 is a block diagram illustrating an electronic device and a wearable electronic device according to various embodiments.

FIG. 2 is a block diagram illustrating an electronic device and a wearable electronic device according to various embodiments. Referring to FIG. 2, an electronic device 210 (e.g., the electronic device 101 of FIG. 1) may be wirelessly connected to a first wearable electronic device 220-1 and a second wearable electronic device 220-2. For example, the electronic device 210 may be connected to at least one of the first wearable electronic device 220-1 and/or the second wearable electronic device 220-2 through short-range wireless communication (e.g., Bluetooth and WiFi). However, examples are not limited thereto, and at least one of the first wearable electronic device 220-1 and/or the second wearable electronic device 220-2 may be connected to the electronic device 210 by wire.

The first wearable electronic device 220-1 may operate as a master, and the second wearable electronic device 220-2 may operate as a slave, or vice versa. For example, the first wearable electronic device 220-1 operating as the master according to a sniffing method may be connected to the electronic device 210 through short-range wireless communication to receive audio data from the electronic device 210 and output the received audio data. The second wearable electronic device 220-2 operating as the slave according to the sniffing method may be connected to the first wearable electronic device 220-1 through short-range wireless communication to receive the audio data from the first wearable electronic device 220-1 and output the received audio data. In this example, to synchronize an audio output timing with the second wearable electronic device 220-2, the first wearable electronic device 220-1 may transmit synchronization (sync) information along with the audio data to the second wearable electronic device 220-2.

The first wearable electronic device 220-1 and/or the second wearable electronic device 220-2 may be a device that is wearable on a body part (e.g., an ear). For example, each of the first wearable electronic device 220-1 and/or the second wearable electronic device 220-2 may be a wireless earphone or a true wireless stereo (TWS) that may be worn on ears. The first wearable electronic device 220-1 may be worn on one ear of a user, and the second wearable electronic device 220-2 may be worn on the other ear of the user.

The first wearable electronic device 220-1 and/or the second wearable electronic device 220-2 may receive an audio signal from the electronic device 210, and output the received audio signal through at least one speaker (e.g., a speaker 420 of FIG. 4 and a speaker 510 of FIG. 5) included in the first wearable electronic device 220-1 and/or the second wearable electronic device 220-2. The audio signal may include, for example, a voice signal of a counterpart conversing on the phone with the user, a music signal, or a sound signal output when multimedia content is reproduced, but is not limited thereto.

The first wearable electronic device 220-1 and/or the second wearable electronic device 220-2 may receive a voice of the user through at least one microphone (e.g., a microphone 430 of FIG. 4, an error microphone 520 of FIG. 5, and a reference microphone 540 of FIG. 5), generate voice data by processing the received voice, and transmit the generated voice data to the electronic device 210.

In the first wearable electronic device 220-1 and/or the second wearable electronic device 220-2, a sound leakage may occur according to how they are worn on the user. An example of wearing the first wearable electronic device 220-1 and/or the second wearable electronic device 220-2 will be described in greater detail below with reference to FIG. 3.

Even though the first wearable electronic device 220-1 and/or the second wearable electronic device 220-2 are normally worn, the sound leakage may occur unintentionally because an ear shape, an ear size, and a state of the inside of an ear may differ for each user.

At least one of the first wearable electronic device 220-1 and/or the second wearable electronic device 220-2 may generate a detection signal for detecting whether the sound leakage occurs, through a speaker, for example. The detection signal may include, for example, a sound signal corresponding to an entire frequency band or a low frequency band that is set in advance to detect the sound leakage, but is not limited to a specific frequency band.

At least one of the first wearable electronic device 220-1 and/or the second wearable electronic device 220-2 may receive, through the microphone, a feedback signal as a signal collected after the generated detection signal is output into an ear canal of the user through the speaker is received, and correct a playback sound based on the feedback signal.

At least one of the first wearable electronic device 220-1 and/or the second wearable electronic device 220-2 may calculate a difference value between the feedback signal and the detection signal and correct the playback sound based on the difference value.

An example structure and example operations of the first wearable electronic device 220-1 and/or the second wearable electronic device 220-2 will be described in greater detail below with reference to FIGS. 4 and 5. An example method of operating the first wearable electronic device 220-1 and/or the second wearable electronic device 220-2 will be described in greater detail below with reference to FIGS. 6 and 10.

Figure 3A:
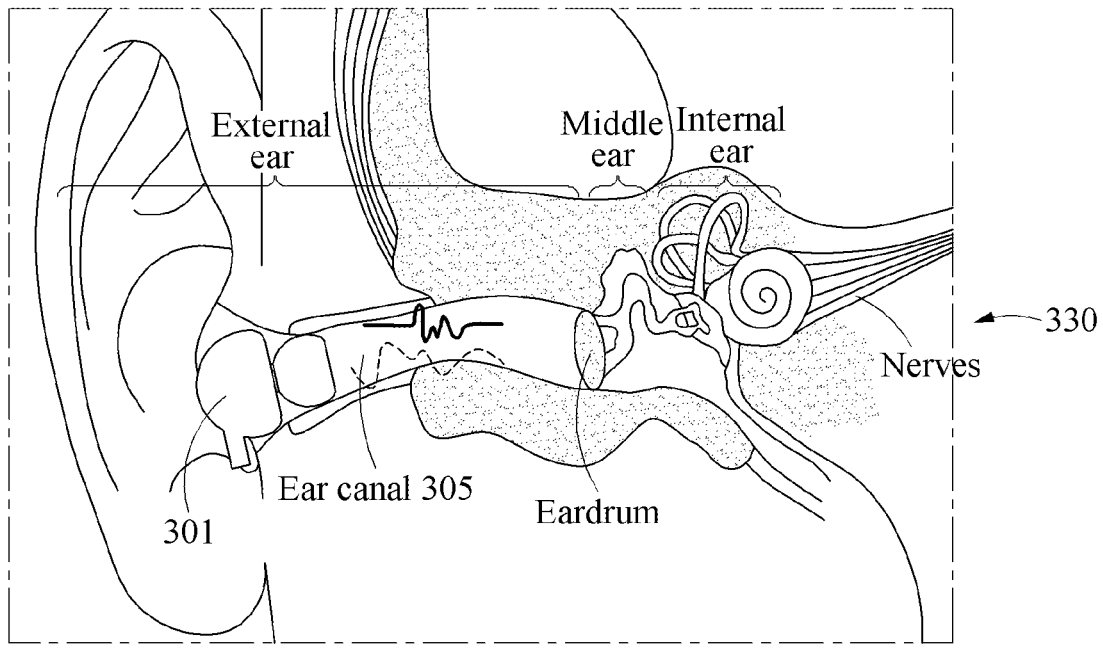
FIGS. 3A and 3B are diagrams illustrating examples of how a wearable electronic device is worn according to various embodiments.
Figure 3B:
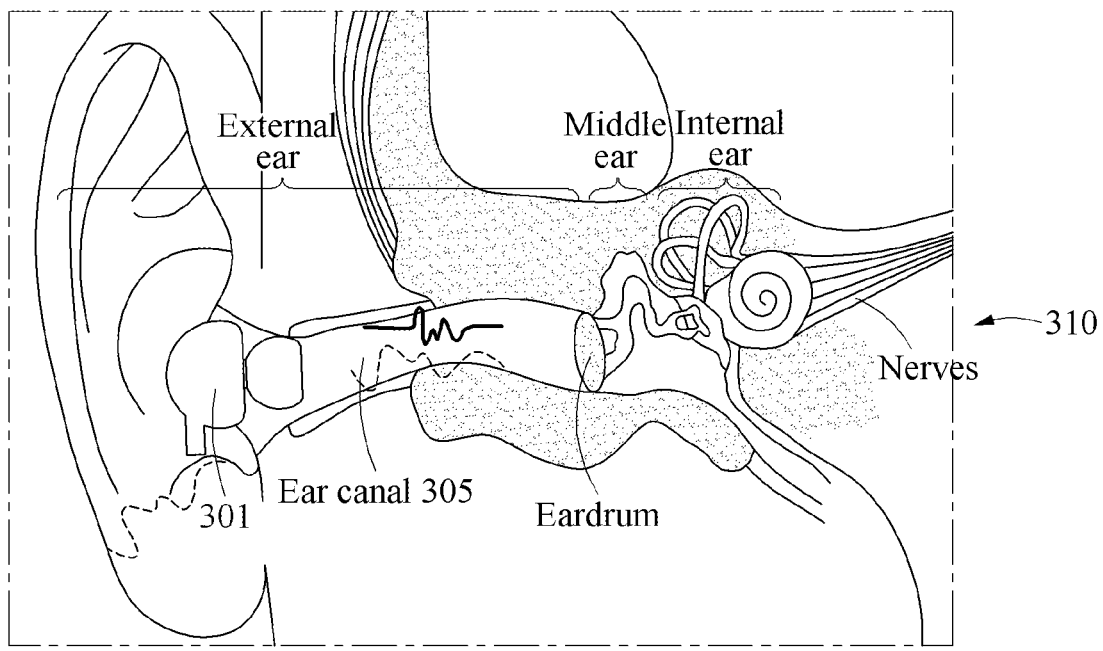

FIGS. 3A and 3B are diagrams illustrating examples of how a wearable electronic device is worn according to various embodiments.

Referring to FIG. 3A, illustrated is an example 310 of a wearable electronic device 301 (e.g., the first wearable electronic device 220-1 or the second wearable electronic device 220-2 of FIG. 2) incorrectly worn on an ear of a user. As illustrated in the example 310, when the wearable electronic device 301 is worn loosely or upside down not to fit an ear canal 305 of the user, or an eartip (not shown) of the wearable electronic device 301 does not fit the ear of the user, a sound may leak out of the ear of the user. The sound leaked out of the ear of the user as described above may be referred to as a sound leakage.

For example, in a case in which a sound leakage occurs when a playback sound is output through the wearable electronic device 301, a portion of a low tone and a middle tone may leak and the playback sound may not be properly transmitted to the user. During a call, a portion of a voice of the user to be collected by an in-ear microphone (e.g., a microphone 430 of FIG. 4) may leak out of the ear, and a voice received by the in-ear microphone may be distorted.

When the wearable electronic device 301 is incorrectly worn, a sound to be collected by the in-ear microphone (e.g., the microphone 430) of the wearable electronic device 301 may not be normally collected even when an active noise cancelation (ANC) function is used, and thus normal attenuation may not occur. In addition, when the wearable electronic device 301 is incorrectly worn and an ambient sound allowing function is used, a sound output to an in-ear speaker (e.g., a speaker 420 of FIG. 4 and a speaker 510 of FIG. 5) of the wearable electronic device 301 may leak out of the ear and then be input back to the microphone (e.g., a microphone 520 of FIG. 5), which forms a feedback loop and causes howling to occur.

When the user wears the wearable electronic device 301 incorrectly, various functions of the wearable electronic device 301 may not operate in a normal way, and the performance of the wearable electronic device 301 may thus be degraded.

Referring to FIG. 3B, illustrated is an example 330 of the wearable electronic device 301 worn normally on an ear of a user. When the wearable electronic device 301 is worn to fit an ear canal 305 of the user as illustrated in the example 330, a sound may not leak out of the ear of the user or an external noise may not be collected by the in-ear microphone (e.g., a microphone 430 of FIG. 4) of the wearable electronic device 301, and thus the wearable electronic device 301 may transmit, to the user, a sound that is not distorted or a sound with reduced distortion.

The wearable electronic device 301 may determine whether the user wears the wearable electronic device 301 correctly, and induce the user to re-wear the wearable electronic device 301 or to replace an eartip.

Even when the wearable electronic device 301 is normally worn as illustrated in the example 330, a sound leakage may occur exceptionally due to at least one of the size of the ear of the user, a shape of the inside of the ear, and/or a foreign material inside the ear. The wearable electronic device 301 may correct a playback sound by compensating for the sound leakage when the sound the leakage occurs.

Figure 4:
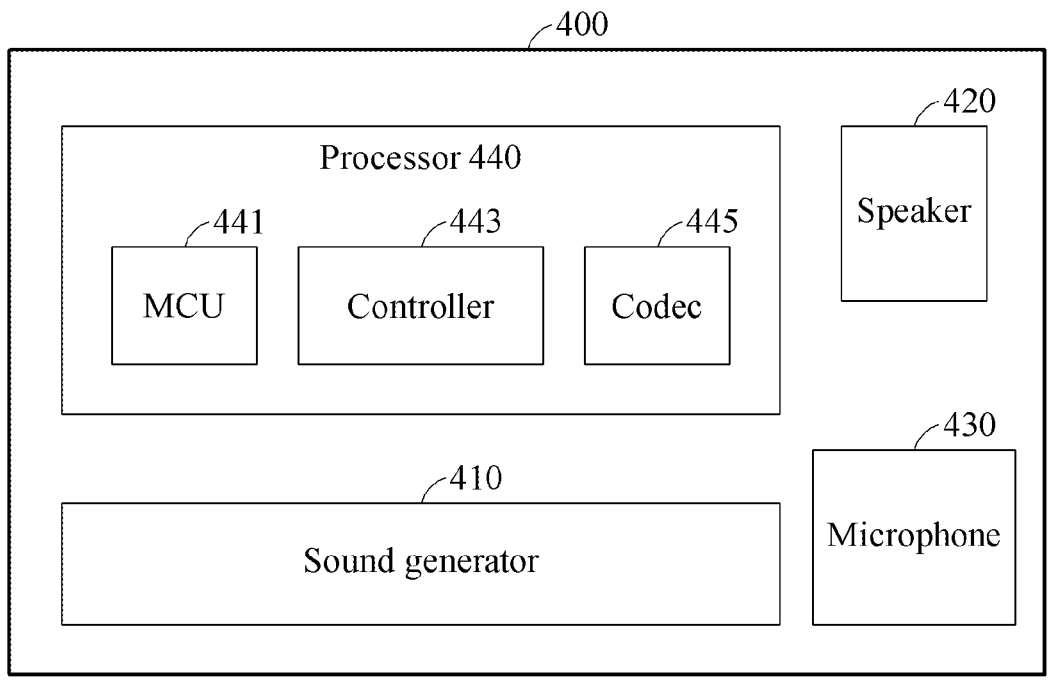
FIG. 4 is a block diagram illustrating an example configuration of an wearable electronic device according to various embodiments.

FIG. 4 is a block diagram illustrating an example configuration of a wearable electronic device according to various embodiments. Referring to FIG. 4, a wearable electronic device 400 (e.g., the first wearable electronic device 220-1 of FIG. 2, the second wearable electronic device 220-2 of FIG. 2, and the wearable electronic device 301 of FIGS. 3A and 3B) may include a sound generator (e.g., including sound generating circuitry) 410, a speaker 420, a microphone 430, and a processor (e.g., including processing circuitry) 440.

The sound generator 410 may include various sound generating circuitry and generate a detection signal (e.g., a tone) to detect whether a sound leakage occurs. As described above, the detection signal may be, for example, a sound signal corresponding to an entire frequency band or a sound signal corresponding to a low frequency band, but is not limited to a specific frequency band. For example, the wearable electronic device 400 may store, in a memory (not shown), media data related to the detection signal and/or data (e.g., frequency band information) of the detection signal.

The sound generator 410 may be a functional block including various circuitry and/or executable program instructions for generating the detection signal (tone), and be implemented as, for example, a hardware (H/W) block (e.g., a hardwired logic), a separate logic inside a digital signal processor (DSP), or software (S/W). A form of the sound generator 410 to be implemented may vary according to examples, but the sound generator 410 may be present independently.

The speaker 420 may output, in a specific direction, the detection signal generated by the sound generator 410. For example, an output direction of the detection signal may be set based on an arrangement direction and/or a shape of a diaphragm included in the speaker 420. For example, the speaker 420 may be designed to output the detection signal in a direction of an ear canal of a user when the user wears the wearable electronic device 400 normally. At least a portion of the speaker 420 may be included in a protrusion (not shown) of a housing of the wearable electronic device 400. The protrusion may be provided in a shape and size that allows it to be inserted into the ear canal of the user. The speaker 420 may be, but not be limited to, an in-ear speaker or a closed speaker. For example, the speaker 420 may be included in the protrusion. At least a portion of the microphone 430 may be included in the protrusion, but is not limited thereto.

The microphone 430 may receive a signal output through the speaker 420. The microphone 430 may be, but not be limited to, an in-ear microphone.

The processor 440 may include various processing circuitry and calculate a difference value between a feedback signal received through the microphone 430 and the detection signal generated by the sound generator 410, and correct a playback sound output by the wearable electronic device 400 based on the difference value. A detection signal transfer path of a wearable electronic device according to an embodiment will be described in more detail with reference to FIG. 5.

The processor 440 may include, for example, a micro control unit (MCU) 441, a controller 443, and a codec 445. The controller 443 and/or the codec 445 may be, but not be limited to, a software module including executable program instructions executed in the processor 440.

The MCU 441 may include various circuitry and communicate with an external electronic device (e.g., the electronic device 101 of FIG. 1) and operate the controller 443. The controller 443 may compare the detection signal and the currently received feedback signal to correct the playback sound, or control the wearable electronic device 400 to provide a notification to the user to re-wear the wearable electronic device 400 or replace an eartip. For example, the controller 443 may be present in the form of software in a DSP, but is not limited thereto.

The codec 445 may drive or operate the speaker 420 and/or the microphone 430. The codec 445 may be, but is not limited to, a hardware codec chip.

For example, when the MCU 441 and the hardware codec 445 are formed as two chips, the DSP may be included in the hardware codec 445. Alternatively, when the MCU 441 and the hardware codec 445 are formed as a single chip, the DSP may be included in the MCU 441. The processor 440 may correct the playback sound based on whether the difference value between the feedback signal and the detected signal corresponds to a permissible compensation range (e.g., a permissible compensation range 710 of FIG. 7) for the sound leakage. A range in which the wearable electronic device 400 classifies a difference value based on a result of detecting a sound leakage will be described in more detail with reference to FIG. 7.

For example, the processor 440 may calculate a first value obtained by converting a frequency of a reference signal, calculate a second value obtained by converting a frequency of the feedback signal, and calculate a difference value between the first value and the second value. The processor 440 may correct the playback sound by compensating the playback sound for the difference value to provide an intended sound without an influence of the sound leakage.

The processor 440 may correct the playback sound based on whether the difference value satisfies a certain compensation condition. The compensation condition may include, for example, a condition that a magnitude of a difference value corresponding to a specific signal in the feedback signal is greater than a sum of magnitudes of difference values corresponding to other signals in the feedback signal. The compensation condition will be described in greater detail below with reference to FIG. 9.

The processor 440 may correct the playback sound by adjusting a weight value corresponding to the signal in the playback sound. When the difference value is in a permissible compensation range (e.g., the permissible compensation range 710), the processor 440 may compensate the playback sound. When the difference value is out of the permissible compensation range (e.g., the permissible compensation range 710), the processor 440 may provide a notification for re-wearing the wearable electronic device 400 or replacing the eartip. For example, when the difference value is greater than a permissible compensation value (e.g., a permissible compensation value 703 of FIG. 7) and is less than or equal to a permissible sound leakage value (e.g., a permissible sound leakage value 705 of FIG. 7), the processor 440 may provide the notification for replacing the eartip. When the difference value is greater than the permissible sound leakage value (e.g., the permissible sound leakage value 705), the processor 440 may provide the notification for re-wearing the wearable electronic device 400. In addition, the wearable electronic device 400 may further include a communication interface (not shown) including various communication circuitry configured to communicate with an external electronic device (e.g., the electronic device 101 of FIG. 1) of the wearable electronic device 400 and/or another wearable electronic device (e.g., the first wearable electronic device 220-1 or the second wearable electronic device 220-2 of FIG. 2) and exchange a signal therewith. The communication interface may support short-range wireless communication. The short-range wireless communication may include, for example, Bluetooth and/or Wi-Fi, but is not necessarily limited thereto. The communication interface may also support wired communication.

Figure 5:
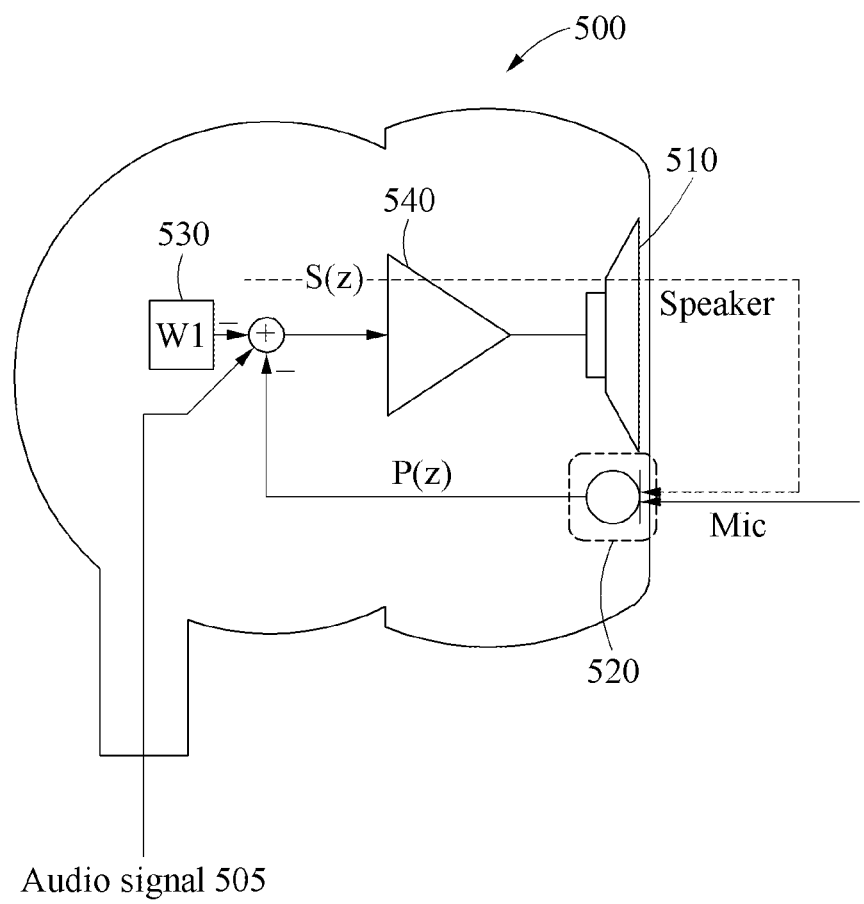
FIG. 5 is a diagram illustrating an example sound transfer path in a wearable electronic device according to various embodiments.

FIG. 5 is a diagram illustrating an example sound transfer path in a wearable electronic device according to various embodiments. Referring to FIG. 5, illustrated is a path through which a detection signal is transferred through a speaker 510 and a microphone 520 in a wearable electronic device 500 (e.g., the wearable electronic device 400 of FIG. 4).

For example, it may be assumed that an audio signal 505 (e.g., a playback sound) to be reproduced is transferred to the wearable electronic device 500.

In this example, the wearable electronic device 500 may generate a detection signal S(z). The detection signal S(z) may be amplified by an amplifier 540, and the amplified detection signal S(z) may be output through the speaker 510 (e.g., the speaker 420 of FIG. 4).

The detection signal S(z) output through the speaker 510 may be received as a feedback signal P(z) through the microphone 520 (e.g., the microphone 430 of FIG. 4). The microphone 520 may include, but is not limited to, an in-ear microphone.

When a signal passing through the microphone 520 is fed back and received as the feedback signal P(z), the wearable electronic device 500 may calculate a difference value between the detection signal S(z) and the feedback signal P(z).

For example, the wearable electronic device 500 may correct the audio signal 505 based on the difference value between the detection signal S(z) and the feedback signal P(z). When the difference value is within a range in which compensation for a sound leakage is available, for example, a permissible compensation range 710 of FIG. 7, the wearable electronic device 500 may correct the audio signal 505 by compensating for the difference value corresponding to the sound leakage. For example, the wearable electronic device 500 may correct the audio signal 505 based on whether the difference value satisfies a certain compensation condition. The compensation condition may include, for example, a condition in which a magnitude of a difference value corresponding to a specific signal in the feedback signal is greater than a sum of magnitudes of difference values corresponding to other signals. The wearable electronic device 500 may correct the audio signal 505 by adjusting a weight value W1 530 corresponding to the signal in the audio signal 505.

When the difference value is out of the range in which the compensation for the sound leakage is available, that is, when the difference value corresponds to a permissible sound leakage range (e.g., a permissible sound leakage range 730 of FIG. 7) or when the difference value is out of the permissible sound leakage range, the wearable electronic device 500 may provide a notification to a user to re-wear the wearable electronic device 500 or replace an eartip, without correcting the audio signal 505.

Figure 6:
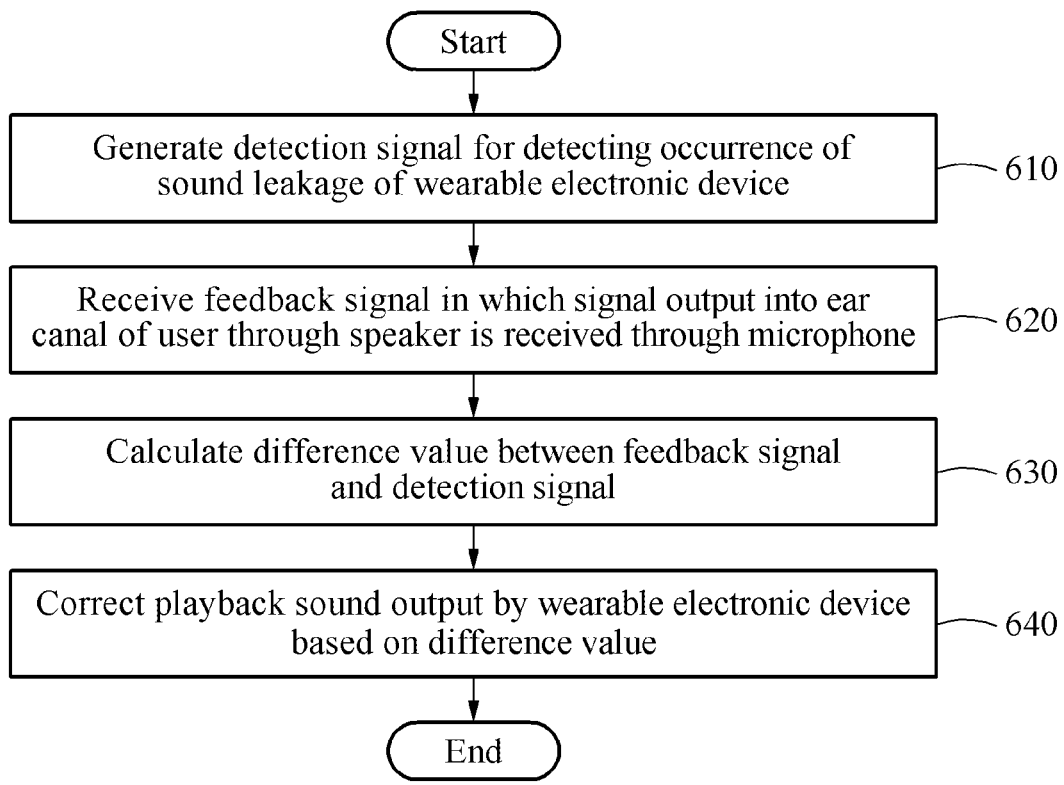
FIG. 6 is a flowchart illustrating an example method of operating a wearable electronic device according to various embodiments.

FIG. 6 is a flowchart illustrating an example method of operating a wearable electronic device according to various embodiments. In the following example, operations may be performed sequentially, but not be necessarily performed sequentially. For example, the operations may be performed in different orders, and at least two of the operations may be performed in parallel.

According to an embodiment, at least one component (e.g., the processor 440 of FIG. 4) of the wearable electronic device 400 (e.g., the external electronic device 102 of FIG. 1, the first wearable electronic device 220-1 and the second wearable electronic device 220-2 of FIG. 2, the wearable electronic device 301 of FIG. 3, and the wearable electronic device 500 of FIG. 5) including a speaker and a microphone may correct a playback sound by performing operations 610 through 640 to be described hereinafter.

In operation 610, the wearable electronic device 400 may generate a detection signal for detecting whether a sound leakage occurs in the wearable electronic device 400. The detection signal generated by the wearable electronic device 400 may be a signal for detecting a sound leakage, and may be, but is not limited to, a detection signal corresponding to an entire frequency band or a detection signal corresponding to a low frequency band. The detection signal may not be limited to a specific frequency band. The detection signal generated by the wearable electronic device 400 may be a single tone or a multi-tone.

In operation 620, the wearable electronic device 400 may receive a feedback signal obtained as a signal output when the detection signal generated in operation 610 is output through the speaker (e.g., the speaker 420 of FIG. 4 and the speaker 510 of FIG. 5) is received through the microphone (e.g., the microphone 430 of FIG. 4 and the error microphone 520 of FIG. 5). The feedback signal may correspond to a signal input to the microphone.

In operation 630, the wearable electronic device 400 may calculate a difference value between the feedback signal received in operation 620 and the detection signal.

In operation 640, the wearable electronic device 400 may correct a playback sound based on the difference value calculated in operation 630. The wearable electronic device 400 may correct the playback sound based on whether the difference value is in a permissible compensation range for the sound leakage, for example, a permissible compensation range 710 of FIG. 7. The wearable electronic device 400 may correct the playback sound by compensating the playback sound for the difference value. The wearable electronic device 400 may correct the playback sound based on whether the difference value satisfies a certain compensation condition. The compensation condition may include a condition in which a magnitude of a difference value corresponding to a specific signal in the feedback signal is greater than a sum of magnitudes of difference values corresponding to other signals. The wearable electronic device 400 may correct the playback sound by adjusting a weight value corresponding to the signal in the playback sound.

A method of correcting a playback sound by the wearable electronic device 400 will be described in greater detail below with reference to FIGS. 8 and 9.

When the difference value is out of the permissible compensation range, the wearable electronic device 400 may provide a notification for re-wearing the wearable electronic device 400 or replacing an eartip.

Figure 7:
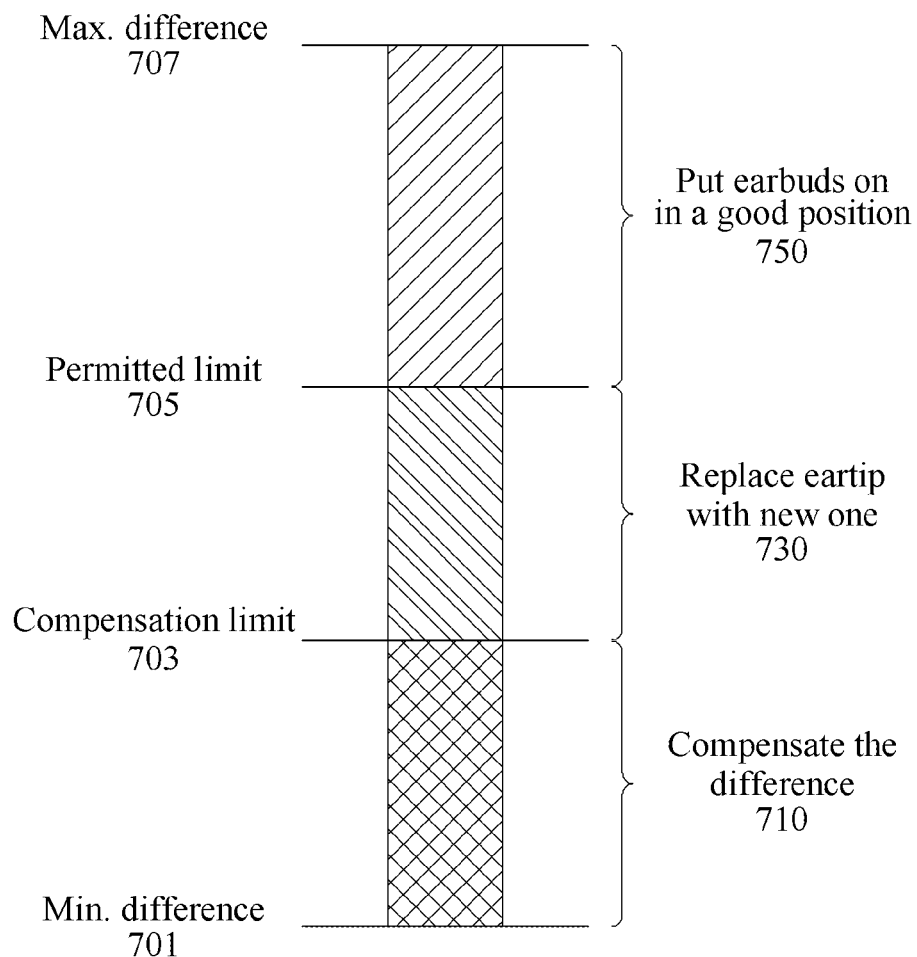
FIG. 7 is a diagram illustrating an example range that classifies a difference value based on a result of detecting a sound leakage by a wearable electronic device according to various embodiments.

FIG. 7 is a diagram illustrating an example range that classifies a difference value based on a result of detecting a sound leakage by a wearable electronic device according to various embodiments. Referring to FIG. 7, illustrated are a permissible compensation range 710 and a permissible sound leakage range 730 divided by thresholds.

The permissible compensation range 710 may be a range in which a playback sound may be corrected by compensating for a difference value, that is, a sound leakage. When the difference value is in the permissible compensation range 710, the wearable electronic device 400 (e.g., the external electronic device 102 of FIG. 1, the first wearable electronic device 220-1 and the second wearable electronic device 220-2 of FIG. 2, the wearable electronic device 301 of FIGS. 3A and 3B, and the wearable electronic device 500 of FIG. 5) may compensate the playback sound for the difference value. For example, the permissible compensation range 710 may correspond to a value between a first threshold value 701 and a permissible compensation value 703. The first threshold value 701 may be a lower limit of the permissible compensation range 710 corresponding to a state in which there is almost no sound leakage, for example, a minimum difference. The permissible compensation value 703 may be an upper limit of the permissible compensation range 710, for example, a compensation limit by which the compensation for the sound leakage is available. The permissible compensation range 710 may correspond to, for example, an interval in which the difference value is 0 to 15%, 0 to 20%, 0 to 25%, or 0 to 30%.

The permissible sound leakage range 730 may correspond to an interval that is greater than the permissible compensation value 703 that is the compensation limit, and is less than or equal to a permissible sound leakage value 705. The permissible sound leakage range 730 may also be referred to as an eartip replacement range 730. For example, the permissible sound leakage range 730 may correspond to an interval in which the difference value is an upper limit up to 40%, 45%, 50%, or 60% from a lower limit that is greater than the permissible compensation value 703 which is an upper limit of the permissible compensation rage 710. When the difference value is in the eartip replacement range 730, the wearable electronic device 400 may provide a notification that reads, for example, "replace eartips with new ones." In this case, the notification may be provided in the form of a voice through a speaker of the wearable electronic device 400. The notification may be provided in the form of a text on a screen of the display module 160 of the electronic device 101 of FIG. 1 communicating with the wearable electronic device 400 or may be provided in the form of a sound through the sound output module 155 of FIG. 1. However, examples are not limited thereto.

When the difference value is in a re-wearing range 750 that is out of the permissible sound leakage range 730, the wearable electronic device 400 may provide a notification for re-wearing. The re-wearing range 750 may correspond to an interval in which the difference value is greater than the permissible sound leakage value 705 and is less than or equal to a second threshold value 707 corresponding to a state in which there is a severe sound leakage, for example, a maximum difference. For example, the re-wearing range 750 may correspond to an interval in which the difference value is an upper limit up to 70%, 80%, 90%, or 95% from a lower limit that is greater than the permissible sound leakage value 705 which is the upper limit of the permissible sound leakage range 730.

The second threshold value 707 may be an upper limit of the sound leakage, which corresponds to a state in which is the difference value, that is, the sound leakage, occupies almost the entirety, for example, the maximum difference.

When the difference value is in the re-wearing range 750, the wearable electronic device 400 (e.g., the wearable electronic device 500 of FIG. 5) may provide a notification that reads, for example, "put earbuds on in a good position." The notification may be provided in the form of a voice through the speaker of the wearable electronic device 400, provided in the form of text on a screen of the display module 160 of the electronic device 101, or provided in the form of a sound through the sound output module 155, in a similar way the notification is provided in association with the eartip replacement range 730.

Figure 8:
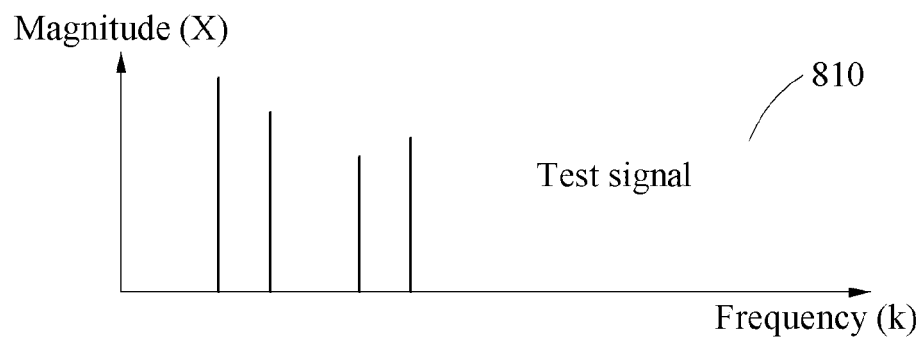
FIG. 8 is a diagram illustrating an example of calculating a difference value between a detection signal and a feedback signal when a wearable electronic device is normally worn according to various embodiments.
Figure 8:
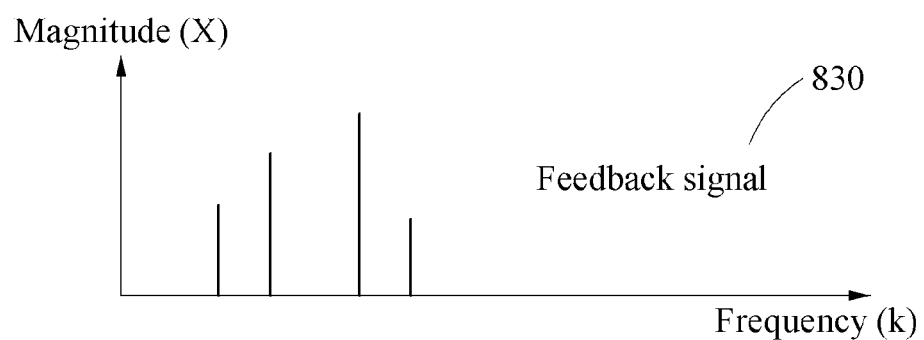
Figure 8:
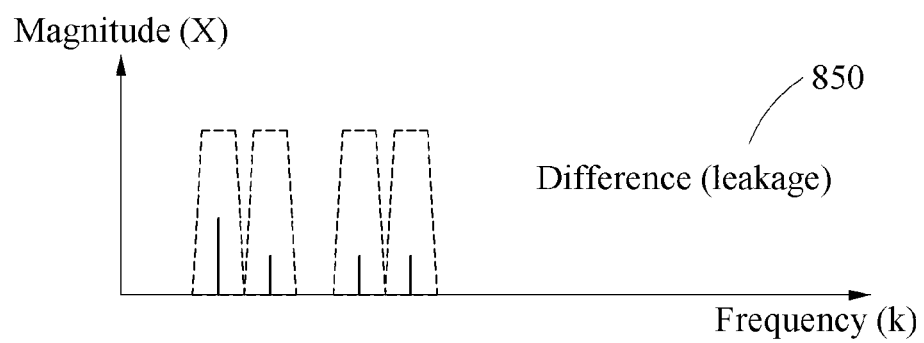

FIG. 8 is a diagram illustrating an example of calculating a difference value between a reference signal and a feedback signal when a wearable electronic device is normally worn according to various embodiments. Referring to FIG. 8, illustrated are a graph 810 obtained by converting a frequency of a test signal for detecting occurrence of a sound leakage in the wearable electronic device 400 (e.g., the external electronic device 102 of FIG. 1, the first wearable electronic device 220-1 and the second wearable electronic device 220-2 of FIG. 2, the wearable electronic device 301 of FIG. 3, and the wearable electronic device 500 of FIG. 5), a graph 830 obtained by converting a frequency of a feedback signal of the wearable electronic device 400, and a graph 850 indicating a difference value between the test signal and the feedback signal. The test signal may correspond to a reference signal.

For example, when a multi-tone is used as illustrated in FIG. 8, the wearable electronic device 400 may calculate the difference value between the test signal illustrated in the graph 810 and the feedback signal illustrated in the graph 830. The wearable electronic device 400 may perform correction by compensating an original playback sound for the calculated difference value. For example, the wearable electronic device 400 may correct the playback sound by calculating the difference value as represented by Equation 1 below.

$$L = \sum_{k=0}^{n} w^k X^k \quad \text{[Equation 1]}$$

In Equation 1 above, k denotes a frequency index, and n denotes the number of tones. In addition, $w^k$ denotes a weight of a kth signal, and $x^k$ denotes a value obtained by converting a frequency of the kth signal.

For example, the wearable electronic device 400 may correct the playback sound by compensating the original playback sound, that is, the test signal illustrated in the graph 810, for a result obtained by applying the weight $w^k$ to difference values respectively corresponding to values $x^k$ obtained by converting frequencies of four multiple tones as illustrated in the graph 850. In this example, $w^k$ may be 1, for example. For another example, when a single tone is used, the wearable electronic device 400 may calculate the difference value through a cross correlation between the test signal and the feedback signal.

Figure 9:
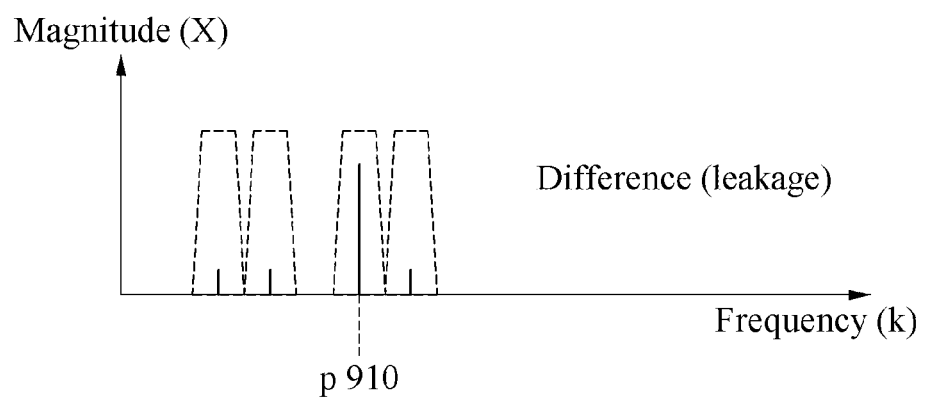
FIG. 9 is a diagram illustrating an example of compensating for a sound leakage when a difference value satisfies a certain compensation condition according to various embodiments.

FIG. 9 is a diagram illustrating an example of compensating for a sound leakage when a difference value satisfies a certain compensation condition according to various embodiments. Referring to FIG. 9, illustrated is a graph obtained when a difference value satisfies a compensation condition.

For example, in an exceptional situation, for example, when an eartip is damaged, the eartip does not match the shape of the inside of an ear of a user, resonance occurs due to a foreign material (e.g., earwax) in the ear of the user, or there is a hole in an eardrum, a sound leakage may occur even though the user correctly wears the wearable electronic device 400 (e.g., the external electronic device 102 of FIG. 1, the first wearable electronic device 220-1 and the second wearable electronic device 220-2 of FIG. 2, the wearable electronic device 301 of FIG. 3, and the wearable electronic device 500 of FIG. 5).

In the foregoing exceptional situation, as illustrated in a graph in FIG. 9, a compensation condition in which a magnitude of a difference value obtained by converting a frequency of a signal (e.g., a signal p 910) is greater than a sum of magnitudes of difference values obtained by converting frequencies of other signals is satisfied, as represented by Equation 2. The magnitude of the difference value(s) may also be referred to as energy.

$$\max(X^p) > \sum_{k=0, k \neq p}^{n} w^k X^k \quad \text{[Equation 2]}$$

In Equation 2 above, p denotes a position of a frequency of a signal (e.g., the signal p 910) that satisfies the compensation condition, and $x^p$ denotes a value obtained by converting the frequency of the signal p 910 that satisfies the compensation condition. In addition, $w^p$ denotes a weight of the signal p 910 that satisfies the compensation condition.

For example, when the signal p 910 satisfies the compensation condition, the wearable electronic device 400 may correct a playback sound by adjusting the weight $w^p$ corresponding to the signal p 910 in the playback sound. In this example, the weight $w^p$ corresponding to the signal p 910 may be represented as $w^p = 1/2^{*}(n-1)$ (k=p).

Figure 10:
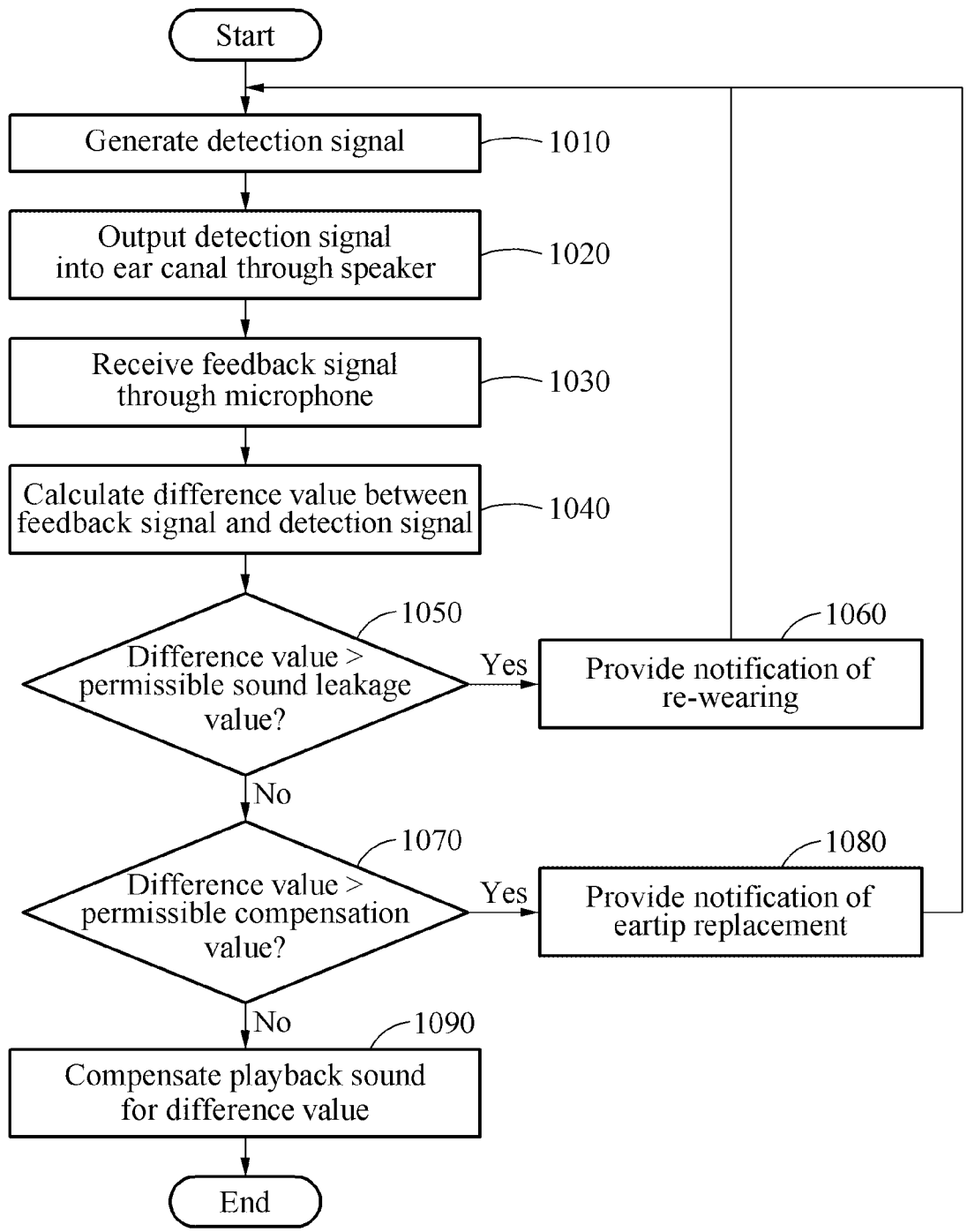
FIG. 10 is a flowchart illustrating an example method of operating a wearable electronic device according to various embodiments.

FIG. 10 is a flowchart illustrating an example method of operating a wearable electronic device according to various embodiments. In the following example, operations may be performed sequentially, but not be necessarily performed sequentially. For example, the operations may be performed in different orders, and at least two of the operations may be performed in parallel.

Referring to FIG. 10, the wearable device 400 (e.g., the external electronic device 102 of FIG. 1, the first wearable electronic device 220-1 and the second wearable electronic device 220-2 of FIG. 2, the wearable electronic device 301 of FIG. 3, and the wearable electronic device 500 of FIG. 5) may detect occurrence of a sound leakage and compensate for a difference value corresponding to the sound leakage by performing operations 1010 through 1090 to be described hereinafter.

The wearable electronic device 400 may perform operations for detecting the occurrence of a sound leakage by allowing a user to select an item from a set menu such that the user detects whether the sound leakage occurs or verifies whether the wearable electronic device 400 is correctly worn on the user.

The wearable electronic device 400 may perform operations for detecting the occurrence of a sound leakage by a preset action pattern of the user. The action pattern may correspond to a combination of actions conducted by the user when the wearable electronic device 400 is not correctly worn on the user. The action pattern may correspond to, for example, various combinations of various actions, for example, adjusting a sound or a sound volume of the wearable electronic device 400, adjusting a wearing position of the wearable electronic device 400, and/or re-wearing the wearable electronic device 400.

In operation 1010, the wearable electronic device 400 may generate a detection signal. The detection signal may be, for example, a signal for detecting the occurrence of a sound leakage, that is, a signal for detecting whether the wearable electronic device 400 is worn to fit an ear of the user.

In operation 1020, the wearable electronic device 400 may output the detection signal generated in operation 1010 into an ear canal of the user through a speaker (e.g., the speaker 420 of FIG. 4 and the speaker 510 of FIG. 5).

In operation 1030, the wearable electronic device 400 may receive a feedback signal through a microphone (e.g., the microphone 430 of FIG. 4 and the microphone 520 of FIG. 5).

In operation 1040, the wearable electronic device 400 may calculate a difference value between the feedback signal received in operation 1030 and the detection signal generated in operation 1010.

In operation 1050, the wearable electronic device 400 may determine whether the difference value calculated in operation 1040 is greater than a permissible sound leakage value (e.g., the permissible sound leakage value 705 of FIG. 7). In operation 1060, when the difference value is determined to be greater than the permissible sound leakage value in operation 1050 (1050—Yes), the wearable electronic device 400 may provide a notification for re-wearing the wearable electronic device 400.

In operation 1070, when the difference value is determined to be less than or equal to the permissible sound leakage value in operation 1050 (1050—No), the wearable electronic device 400 may determine whether the difference value is greater than a permissible compensation value (e.g., the permissible compensation value 703 of FIG. 7). In operation 1080, when the difference value is determined to be greater than the permissible compensation value (1070—Yes), the wearable electronic device 400 may provide a notification for replacing an eartip.

In operation 1090, when the difference value is determined to be less than or equal to the permissible compensation value (1070—No), the wearable electronic device 400 may compensate a playback sound output by the wearable electronic device 400 for the difference value.

According to an example embodiment, a method of operating a wearable electronic device (e.g., the wearable electronic device 400 of FIG. 4) including a speaker (e.g., the speaker 420 of FIG. 4 and the speaker 510 of FIG. 5) and a microphone (e.g., the microphone 430 of FIG. 4 and the microphone 520 of FIG. 5) may include: generating a detection signal for detecting whether a sound leakage occurs in the wearable electronic device, receiving a feedback signal in which a signal output from the detection signal into an ear canal through the speaker is received through the microphone, calculating a difference value between the feedback signal and the detection signal, and correcting a playback sound output by the wearable electronic device based on the difference value.

The correcting may include correcting the playback sound based on whether the difference value is in a permissible compensation range (e.g., the permissible compensation range 710 of FIG. 7) for the sound leakage.

The correcting may include correcting the playback sound by compensating the detection signal for the difference value.

The correcting may include correcting the playback sound based on whether the difference value satisfies a certain compensation condition.

The compensation condition may include a condition that a magnitude of a difference value corresponding to a specific signal in the feedback signal is greater than a sum of magnitudes of difference values corresponding to other signals.

For example, based on the difference value corresponding to the specific signal satisfying the compensation condition, the correcting may include correcting the playback sound by adjusting a weight value corresponding to the specific signal in the playback sound.

Based on the difference value being out of the permissible compensation range, the method of operating the wearable electronic device may further include providing a notification for re-wearing the wearable electronic device or of replacing an eartip.

The providing the notification may include providing the notification for replacing the eartip based on the difference value being greater than a permissible compensation value (e.g., the permissible compensation value 703 of FIG. 7) of the permissible sound leakage range (e.g., 710) and being less than or equal to a permissible sound leakage value (e.g., the permissible sound leakage value 705 of FIG. 7) of a permissible sound leakage range (e.g., the permissible sound leakage range 730 of FIG. 7).

The providing the notification may include providing the notification for re-wearing the wearable electronic device based on the difference value being greater than the permissible sound leakage value of the permissible sound leakage range.

The calculating may include calculating a first value obtained by converting a frequency of the detection signal, calculating a second value obtained by converting a frequency of the feedback signal, and calculating the difference value between the first value and the second value.

According to an example embodiment, a wearable electronic device (e.g., the wearable electronic device 400 of FIG. 4) may include: a sound generator (e.g., the sound generator 410 of FIG. 4) comprising circuitry configured to generate a detection signal to detect whether a sound leakage occurs, a speaker (e.g., the speaker 420 of FIG. 4 and the speaker 510 of FIG. 5) configured to output the detection signal into an ear canal, a microphone (e.g., the microphone 430 of FIG. 4 and the microphone 520 of FIG. 5) configured to receive a signal output through the speaker, and a processor (e.g., the processor 440 of FIG. 4) configured to: calculate a difference value between a feedback signal received through the microphone and the detection signal and correct a playback sound based on the difference value.

The processor may be configured to correct the playback sound based on whether the difference value is in a permissible compensation range (e.g., 710) for the sound leakage. The processor may be configured to correct the playback sound by compensating the detection signal for the difference value.

The processor may be configured to correct the playback sound based on whether the difference value satisfies a certain compensation condition.

The compensation condition may include a condition that a magnitude of a difference value corresponding to a specific signal in the feedback signal is greater than a sum of magnitudes of difference values corresponding to other signals.

The processor may be configured to correct the playback sound by adjusting a weight value corresponding to the specific signal in the playback sound.

Based on the difference value being out of the permissible compensation range, the processor may be configured to provide a notification for re-wearing the wearable electronic device or of replacing an eartip.

Based on the difference value being greater than a permissible compensation value (e.g., 703) of the permissible compensation range and being less than or equal to a permissible sound leakage value (e.g., 705) of a permissible sound leakage range (e.g., 730), the processor may be configured to provide the notification for replacing the eartip.

Based on the difference value being greater than the permissible sound leakage value of the permissible sound leakage range, the processor may be configured to provide the notification for re-wearing the wearable electronic device.

The processor may be configured to: calculate a first value obtained by converting a frequency of the detection signal, calculate a second value obtained by converting a frequency of the feedback signal, and calculate the difference value between the first value and the second value.

The processor may include a codec (e.g., 445) configured to operate the speaker (e.g., 420 and 510) and the microphone (e.g., 430 and 520).

The wearable electronic device may further include a communication interface comprising communication circuitry configured to communicate with an external electronic device (e.g., the electronic device 101 of FIG. 1) of the wearable electronic device and exchange signals therewith.

While the disclosure has been illustrated and described with reference to various example embodiments, it will be understood that the various example embodiments are intended to be illustrative, not limiting. It will further be understood by those skilled in the art that various changes in form and detail may be made without departing from the true spirit and full scope of the disclosure, including the appended claims and their equivalent. It will also be understood that any of the embodiment(s) described herein may be used in conjunction with any other embodiment(s) described herein.

What is claimed is:

1. A method of operating a wearable electronic device comprising a speaker and a microphone, the method comprising:
    generating a detection signal for detecting whether a sound leakage of the wearable electronic device occurs;
    receiving, through the microphone, a feedback signal in which a signal obtained by outputting the detection signal into an ear canal through the speaker is collected;
    calculating a difference value between the feedback signal and the detection signal; and
    correcting a playback sound output by the wearable electronic device based on the difference value being within a permissible compensation range for the sound leakage; and
    providing a notification to the user to adjust or replace the wearable electronic device based on the difference value exceeding the permissible compensation range for the sound leakage.

2. The method of claim 1, wherein the correcting of the playback sound comprises:
    correcting the playback sound based on whether the difference value corresponds to a permissible compensation range for the sound leakage.

3. The method of claim 2, wherein the correcting of the playback sound comprises:
    correcting the playback sound by compensating the playback sound for the difference value.

4. The method of claim 2, wherein the providing of a notification to the user to adjust or replace the wearable electronic device comprises:
    providing a notification for re-wearing the wearable electronic device or replacing an eartip.

5. The method of claim 4, wherein the providing of the notification to the user to adjust or replace the wearable electronic device comprises:
    providing the notification for replacing the eartip based on the difference value being greater than a permissible compensation value of the permissible compensation range and being less than or equal to a permissible sound leakage value of a permissible sound leakage range.

6. The method of claim 4, wherein the providing of the notification to the user to adjust or replace the wearable electronic device comprises:
    providing the notification for re-wearing the wearable electronic device based on the difference value being greater than a permissible sound leakage value of a permissible sound leakage range.

7. The method of claim 1, wherein the correcting of the playback sound comprises:
    correcting the playback sound based on whether the difference value satisfies a specific compensation condition.

8. The method of claim 7, wherein the compensation condition comprises a condition wherein a magnitude of the difference value corresponding to a specific signal in the feedback signal is greater than a sum of magnitudes of difference values corresponding to other signals in the feedback signal.

9. The method of claim 8, wherein, based on the difference value corresponding to the signal satisfying the compensation condition, the correcting of the playback sound comprises:
    correcting the playback sound by adjusting a weight value corresponding to the signal in the playback sound.

10. The method of claim 1, wherein the calculating of the difference value comprises:
    calculating a first value obtained by converting a frequency of the detection signal;
    calculating a second value obtained by converting a frequency of the feedback signal; and
    calculating a difference value between the first value and the second value.

11. A non-transitory computer-readable storage medium storing instructions that, when executed by a processor, cause the processor to perform the operations of claim 1.

12. A wearable electronic device, comprising:
    a sound generator comprising circuitry configured to generate a detection signal to detect whether a sound leakage occurs;
    a speaker configured to output the detection signal into an ear canal;
    a microphone configured to receive a signal output through the speaker; and
    a processor configured to:
    calculate a difference value between a feedback signal received through the microphone and the detection signal;
    correct a playback sound output by the wearable electronic device based on the difference value being within a permissible compensation range for the sound leakage; and
    provide a notification to the user to adjust or replace the wearable electronic device based on the difference value exceeding the permissible compensation range for the sound leakage.

13. The wearable electronic device of claim 12, wherein the processor is configured to:
    correct the playback sound by compensating the playback sound for the difference value based on whether the difference value corresponds to a permissible compensation range for the sound leakage.

14. The wearable electronic device of claim 13, wherein the processor is configured to:
    correct the playback sound by compensating the playback sound for the difference value.

15. The wearable electronic device of claim 13, wherein the processor is configured to:
    provide a notification to the user to adjust or replace the wearable electronic device by providing a notification to re-wear or replace an eartip based on the difference value being out of the permissible compensation range.

16. The wearable electronic device of claim 15, wherein the processor is configured to:
    provide the notification to the user to replace the eartip based on the difference value being greater than a permissible compensation value of the permissible compensation range and being less than or equal to a permissible sound leakage value of a permissible sound leakage range, or
    provide the notification to the user to for-re-wearing the wearable electronic device based on the difference value being greater than a permissible sound leakage value of a permissible sound leakage range.

17. The wearable electronic device of claim 12, wherein the processor is configured to:

correct the playback sound based on whether the difference value satisfies a specific compensation condition.

18. The wearable electronic device of claim 17, wherein the compensation condition comprises a condition wherein a magnitude of the difference value corresponding to a signal in the feedback signal is greater than a sum of magnitudes of difference values corresponding to other signals in the feedback signal.

19. The wearable electronic device of claim 18, wherein the processor is configured to:
correct the playback sound by adjusting a weight value corresponding to the signal in the playback sound.

20. The wearable electronic device of claim 12, wherein the processor is configured to:
calculate a first value obtained by converting a frequency of the detection signal, calculate a second value obtained by converting a frequency of the feedback signal, and calculate a difference value between the first value and the second value.

\* \* \* \* \*